United States Patent
Suzuki et al.

(10) Patent No.: US 11,559,972 B2
(45) Date of Patent: Jan. 24, 2023

(54) MULTILAYER STRUCTURE AND USE OF SAME

(71) Applicant: KURARAY CO., LTD., Kurashiki (JP)

(72) Inventors: Makoto Suzuki, Kurashiki (JP); Naoki Kawakami, Kurashiki (JP)

(73) Assignee: KURARAY, CO., LTD., Okayama (JP)

( * ) Notice: Subject to any disclaimer, the term of this patent is extended or adjusted under 35 U.S.C. 154(b) by 0 days.

(21) Appl. No.: 16/339,420

(22) PCT Filed: Nov. 1, 2017

(86) PCT No.: PCT/JP2017/039570
§ 371 (c)(1),
(2) Date: Apr. 4, 2019

(87) PCT Pub. No.: WO2018/084187
PCT Pub. Date: May 11, 2018

(65) Prior Publication Data
US 2019/0232622 A1    Aug. 1, 2019

(30) Foreign Application Priority Data
Nov. 2, 2016 (JP) .............................. JP2016-214884

(51) Int. Cl.
| | | |
|---|---|---|
| *B32B 27/08* | (2006.01) | |
| *B32B 1/02* | (2006.01) | |
| *B32B 27/30* | (2006.01) | |
| *B32B 27/32* | (2006.01) | |
| *B65D 65/40* | (2006.01) | |
| *B32B 27/20* | (2006.01) | |
| *B65D 1/02* | (2006.01) | |
| *C08L 29/04* | (2006.01) | |
| *B32B 27/28* | (2006.01) | |

(52) U.S. Cl.
CPC ............... *B32B 27/08* (2013.01); *B32B 1/02* (2013.01); *B32B 27/20* (2013.01); *B32B 27/28* (2013.01); *B32B 27/306* (2013.01); *B32B 27/32* (2013.01); *B65D 1/02* (2013.01); *B65D 65/40* (2013.01); *C08L 29/04* (2013.01); *B32B 2264/0207* (2013.01); *B32B 2307/412* (2013.01); *B32B 2307/7244* (2013.01); *B32B 2439/00* (2013.01)

(58) Field of Classification Search
CPC .. B32B 1/02; B32B 7/12; B32B 27/08; B32B 27/20; B32B 27/28; B32B 27/306; B32B 27/32; B32B 2250/02; B32B 2250/03; B32B 2250/24; B32B 2264/0207; B32B 2264/0235; B32B 2264/0264; B32B 2264/0278; B32B 2264/0292; B32B 2270/00; B32B 2274/00; B32B 2307/412; B32B 2307/418; B32B 2307/7242; B32B 2307/422; B32B 2307/748; B32B 2439/00; B32B 2439/40; B32B 2439/70; B32B 2307/7244; B65D 1/02; B65D 65/40; C08L 29/04
See application file for complete search history.

(56) References Cited

U.S. PATENT DOCUMENTS

| | | | | |
|---|---|---|---|---|
| 4,963,426 A | * | 10/1990 | Nishimoto | ............. B32B 27/08 428/213 |
| 5,358,785 A | * | 10/1994 | Akao | ..................... B29C 65/02 428/349 |
| 6,960,376 B2 | * | 11/2005 | Tai | ........................ A23L 3/3436 428/36.6 |
| 2004/0006182 A1 | | 1/2004 | Omori | |
| 2004/0241365 A1 | * | 12/2004 | Inoue | .................... B65D 81/18 428/35.7 |
| 2012/0052225 A1 | | 3/2012 | Kani et al. | |
| 2015/0144523 A1 | | 5/2015 | Hirose | |
| 2015/0360843 A1 | * | 12/2015 | Barbaroux | ......... C08L 23/0815 435/289.1 |
| 2016/0221728 A1 | | 8/2016 | Taruno | |
| 2017/0029156 A1 | | 2/2017 | Eguchi et al. | |
| 2017/0036802 A1 | | 2/2017 | Taruno | |

FOREIGN PATENT DOCUMENTS

| | | | | |
|---|---|---|---|---|
| CN | 1536022 A | 10/2004 | | |
| CN | 104271453 A | 1/2015 | | |
| CN | 105793162 A | 7/2016 | | |
| EP | 2436728 A1 | * 4/2012 | ............. | C08L 29/04 |
| JP | 50-18553 | 2/1975 | | |
| JP | 7-173348 A | 7/1995 | | |
| JP | 11-349743 A | 12/1999 | | |
| JP | 2012-111879 A | 6/2012 | | |
| JP | 2015-67290 A | 4/2015 | | |
| JP | 2015-163531 A | 9/2015 | | |
| WO | WO 2010/137659 A1 | 12/2010 | | |

* cited by examiner

OTHER PUBLICATIONS

International Search Report dated Feb. 6, 2018 in PCT/JP2017/039570 filed on Nov. 1, 2017.

*Primary Examiner* — Eli D. Strah
*Assistant Examiner* — Thomas J Kessler
(74) *Attorney, Agent, or Firm* — Morgan, Lewis & Bockius LLP

(57) ABSTRACT

A multilayer structure includes a layer of a resin composition containing an ethylene-vinyl alcohol copolymer and a thermoplastic elastomer, wherein a mass ratio of the ethylene-vinyl alcohol copolymer to the thermoplastic elastomer is from 65/35 to 95/5 and the layer of the resin composition has one surface directly adjacent to a layer of polyolefin with no polar functional group. A multilayer structure is thus provided that is excellent in gas barrier properties, transparency, and flexibility and also has good delamination properties between the layer of the resin composition and the layer of the polyolefin with no polar functional group.

20 Claims, No Drawings

MULTILAYER STRUCTURE AND USE OF SAME

TECHNICAL FIELD

The present invention relates to a multilayer structure with a layer of a resin composition containing an ethylene-vinyl alcohol copolymer and a thermoplastic elastomer and use of the same.

BACKGROUND ART

Ethylene-vinyl alcohol copolymers (hereinafter, may be abbreviated as EVOH) exhibit excellent gas barrier properties to gases, such as oxygen, and are also excellent in melt moldability, and thus are molded into films, bottles, and the like to be widely used for blocking gases, such as oxygen, including packaging materials for foods and beverages. Patent Document 1 describes a method of producing a molded product, including: blending from 2 to 100 parts by weight of a thermoplastic polyester-polyether block copolymer elastomer having a crystalline melting point from 150° C. to 230° C. and a modulus of impact resilience of 50% or more to 100 parts by weight of a saponified ethylene-vinyl acetate copolymer having an ethylene content from 20 to 50 mol % and vinyl acetate parts with a degree of saponification of 90 mol % or more; followed by melt molding. This is considered to allow marked improvement in impact resistance at ordinary temperature and low temperatures without much reducing mechanical, such as tensile and bending, strength.

Patent Documents 2 and 3 describe delaminatable containers using EVOH. Such a delaminatable container here is a type of packaging material for foods and beverages where a decrease of contents causes delamination of an inner layer of the multilayer container from an outer layer and shrinkage to inhibit entrance of air into the container. For example, Patent Document 2 describes a delaminatable container, comprising: a body to store contents; and a mouth to discharge the contents from the body, the body and the mouth having an outer layer and an inner layer, and the inner layer delaminated from the outer layer to be shrunk with a decrease of the contents, wherein the inner layer includes a layer with standard peel strength from 7 to 12 g/15 mm as an outermost layer. This is considered to enable an ideal delaminatable container in which the inner layer is readily delaminated from the outer layer in the body and the inner layer is not readily delaminated from the outer layer in the mouth.

Patent Document 3 describes a delaminatable container, comprising an outer layer and an inner layer, the inner layer delaminated from the outer layer to be shrunk with a decrease of contents, wherein the inner layer includes an internal EVOH layer of an EVOH resin as an innermost layer. This is considered to less reduce the citrus aroma emitted by a citrus-based liquid condiment when the innermost layer of the inner layer is such an EVOH layer of the EVOH resin.

PRIOR ART DOCUMENT

Patent Documents

Patent Document 1: JP 50-18553A
Patent Document 2: JP 2015-67290A
Patent Document 3: JP 2015-163531A

SUMMARY OF THE INVENTION

Problems to be Solved by the Invention

In recent years, delaminatable containers are expected to have higher delamination properties and multilayer structures are desired to have high delamination properties and also to be excellent in gas barrier properties. To be used as packaging materials for foods and beverages, multilayer structures are also desired to be excellent in transparency and flexibility in addition to delamination properties and gas barrier properties.

Patent Document 1, however, does not mention transparency and flexibility while describing improvement in impact resistance, and also does not mention use of the resin composition of Patent Document 1 as a delaminatable container. Patent Documents 2 and 3 describe the delaminatable containers while the delamination properties were not quite sufficient.

The present invention has been made to solve the above problems and it is an object thereof to provide a multilayer structure that is excellent in gas barrier properties, transparency, and flexibility and has good delamination properties between a layer of a resin composition and a layer of polyolefin with no polar functional group.

Means for Solving the Problems

To solve the above problems, the present invention provides a multilayer structure described below and a delaminatable container comprising the same.

That is, the present invention is achieved by providing:
[1] a multilayer structure, comprising a layer of a resin composition containing an ethylene-vinyl alcohol copolymer (A) and a thermoplastic elastomer (B), wherein a mass ratio (A/B) of the ethylene-vinyl alcohol copolymer (A) to the thermoplastic elastomer (B) is from 65/35 to 95/5, and the layer of the resin composition has one surface directly adjacent to a layer of polyolefin (C1) with no polar functional group;
[2] the multilayer structure of [1], wherein the thermoplastic elastomer (B) is at least one selected from the group consisting of a polyester-based thermoplastic elastomer, a polystyrene-based thermoplastic elastomer, a polyurethane-based thermoplastic elastomer, a polyolefin-based thermoplastic elastomer, and a polyamide-based thermoplastic elastomer;
[3] the multilayer structure of [1] or [2], wherein, in the resin composition, particles of the thermoplastic elastomer (B) are dispersed in a matrix of the ethylene-vinyl alcohol copolymer (A);
[4] the multilayer structure of [3], wherein the thermoplastic elastomer (B) has an average particle diameter of 4.5 μm or less;
[5] the multilayer structure of any one of [1] through [4], wherein a refractive index difference between the ethylene-vinyl alcohol copolymer (A) and the thermoplastic elastomer (B) is 0.05 or less;
[6] the multilayer structure of any one of [1] through [5], wherein a delamination area between the layer of the resin composition and the layer of the polyolefin (C1) is from 80 to 300 $cm^2$;
[7] the multilayer structure of any one of [1] through [6], wherein standard peel strength between the layer of the resin composition and the layer of the polyolefin (C1) is from 1 to 12 g/30 mm;
[8] the multilayer structure of any one of [1] through [7], wherein another surface, not directly adjacent to the layer of the polyolefin (C1) with no polar functional group, of the layer of the resin composition is adhered to a layer of polyolefin (C2) via a layer of an adhesive resin (D); and

[9] a delaminatable container, comprising the multilayer structure of any one of [1] through [8].

Effects of the Invention

The present invention makes it possible to provide a multilayer structure that is excellent in gas barrier properties, transparency, and flexibility and has good delamination properties between a layer of a resin composition and a layer of polyolefin with no polar functional group. Accordingly, such a multilayer structure is preferably used as a delaminatable container.

MODES FOR CARRYING OUT THE INVENTION

A multilayer structure of the present invention includes a layer of a resin composition (hereinafter, may be abbreviated as "the present resin composition") containing an ethylene-vinyl alcohol copolymer (A) (hereinafter, may be abbreviated as "EVOH (A)") and a thermoplastic elastomer (B), wherein a mass ratio (A/B) of the EVOH (A) to the thermoplastic elastomer (B) is from 65/35 to 95/5, and the layer of the resin composition has one surface directly adjacent to a layer of polyolefin (C1) with no polar functional group. The present inventors have found that a multilayer structure satisfying such configuration leads to good flexibility, while maintaining excellent gas barrier properties and transparency, and also good delamination properties between the layer of the resin composition and the layer of the polyolefin (C1) (hereinafter, may be abbreviated as "delamination properties").

<Resin Composition>

The present resin composition contains the EVOH (A) and the thermoplastic elastomer (B), where a mass ratio (A/B) of the EVOH (A) to the thermoplastic elastomer (B) is from 65/35 to 95/5. The mass ratio (A/B) is 65/35 or more, preferably 70/30 or more, and more preferably 75/25. A mass ratio (A/B) of less than 65/35 is prone to have insufficient gas barrier properties and transparency. In particular, when the multilayer structure of the present invention is used as a delaminatable container, the mass ratio (A/B) of less than 65/35 is prone to cause insufficient gas barrier properties, transparency, and delamination properties. The mass ratio (A/B) is 95/5 or less, preferably 90/10 or less, and more preferably 85/15 or less. A mass ratio (A/B) of more than 95/5 is prone to have insufficient flexibility. In particular, when the multilayer structure of the present invention is used as a delaminatable container, the mass ratio (A/B) of more than 95/5 causes reduction in flexibility and a pinhole is easily developed in the present resin composition during use, thus stable gas barrier properties are prone not to be maintained.

(EVOH (A))

The EVOH (A) contained in the present resin composition is not particularly limited and usually obtained by saponifying an ethylene-vinyl ester copolymer. The copolymerization of ethylene and vinyl ester and the saponification of the ethylene-vinyl ester copolymer can be carried out by known methods. A representative example of such vinyl ester includes vinyl acetate while other examples of such vinyl ester may include fatty acid vinyl ester (vinyl formate, vinyl propionate, vinyl valerate, vinyl caproate, vinyl laurate, vinyl stearate, vinyl pivalate, vinyl versatate, etc.). The EVOH (A) may be used singly or by mixing two or more types.

The EVOH (A) preferably has a degree of saponification of 90 mol % or more, more preferably 95 mol % or more, and even more preferably 99 mol % or more. The EVOH (A) may have a degree of saponification of 100 mol % or less or 99.99 mol % or less. The EVOH (A) with a degree of saponification in the above range is preferred for good gas barrier properties. The degree of saponification can be measured by the method in accordance with JIS K 6726 (1994).

The EVOH (A) preferably has an ethylene unit content of 20 mol % or more, more preferably 23 mol % or more, and even more preferably 25 mol % or more. The ethylene unit content of 20 mol % or more is preferred for improvement in flexibility and melt moldability. The EVOH (A) preferably has an ethylene unit content of 65 mol % or less, more preferably 55 mol % or less, and even more preferably 50 mol % or less. The ethylene unit content of 65 mol % or less is preferred for improvement in gas barrier properties and delamination properties.

The EVOH (A) may be copolymerized with another monomer in addition to ethylene, vinyl ester, and a saponified product thereof as long as not inhibiting the effects of the present invention. Examples of such a monomer may include: α-olefins, such as propylene, 1-butene, 1-hexene, and 4-methyl-1-pentene; unsaturated acids, such as acrylic acid, methacrylic acid, crotonic acid, maleic acid, fumaric acid, and itaconic acid, anhydrides thereof, salts thereof, mono- or di-alkyl esters, or the like; nitriles, such as acrylonitrile and methacrylonitrile; amides, such as acrylamide, methacrylamide, N-(2-dimethylaminoethyl)methacrylamide, and N,N-butoxymethyl acrylamide, or quaternary compounds thereof; olefin sulfonic acids, such as vinyl sulfonic acid, allyl sulfonic acid, and methallyl sulfonic acid, or salts thereof; vinylsilane compounds, such as vinyltrimethoxysilane, vinyltriethoxysilane, vinyltri(β-methoxy-ethoxy)silane, and y-methacryloxypropyl methoxysilane; alkyl vinyl ethers, N-vinylimidazole or quaternary compounds thereof, vinyl ketone, N-vinylpyrrolidone, vinyl chloride, vinylidene chloride, and the like. The EVOH (A) with such other monomer units preferably has a content of the other monomer units to all structural units of the EVOH (A) of 30 mol % or less, more preferably 20 mol % or less, even more preferably 10 mol % or less, and particularly preferably 5 mol % or less. The EVOH (A) with units derived from such another monomer may have a lower limit of 0.05 mol % or 0.10 mol %.

(Thermoplastic Elastomer (B))

The thermoplastic elastomer (B) contained in the present resin composition is not particularly limited and it is allowed to use a polyester-based thermoplastic elastomer, a polystyrene-based thermoplastic elastomer, a polyurethane-based thermoplastic elastomer, a polyolefin-based thermoplastic elastomer, a polyimide-based thermoplastic elastomer, and the like. They may be used singly or in combination of two or more. Among all, from the perspective of improvement in delamination properties, the thermoplastic elastomer (B) is preferably at least one selected from the group consisting of a polyester-based thermoplastic elastomer, a polystyrene-based thermoplastic elastomer, and a polyurethane-based thermoplastic elastomer, is more preferably at least one selected from the group consisting of a polyester-based thermoplastic elastomer and a polystyrene-based thermoplastic elastomer, and is even more preferably a polyester-based thermoplastic elastomer.

The thermoplastic elastomer (B) contained in the present resin composition is preferably a modified thermoplastic elastomer. Such a modified thermoplastic elastomer is preferably modified with unsaturated carboxylic acid or a derivative thereof, and examples of such unsaturated carboxylic acid or a derivative thereof may include maleic acid, fumaric acid, itaconic acid, maleic anhydride, itaconic anhydride, monomethyl maleate, monoethyl maleate, diethyl maleate, monomethyl fumarate, and the like. Among all, a maleic anhydride-modified thermoplastic elastomer is more preferred. The thermoplastic elastomer (B) being the modified thermoplastic elastomer as described above is preferred for increased compatibility with the EVOH (A) and more improvement in gas barrier properties, transparency, flexibility, and delamination properties.

The above polyester-based thermoplastic elastomer (TPEE) is a multiblock copolymer containing polyester as the hard segment in the molecule and polyether or polyester with a low glass transition temperature (Tg) as the soft segment. Such TPEE can be classified into the following types according to a difference in the molecular structure. Among them, polyester-polyether type TPEE and polyester-polyester type TPEE are in the mainstream.

(1) Polyester-Polyether Type TPEE

In general, this is a thermoplastic elastomer using crystalline aromatic polyester as the hard segment and polyether as the soft segment.

(2) Polyester-Polyester Type TPEE

This is a thermoplastic elastomer using crystalline aromatic polyester as the hard segment and aliphatic polyester as the soft segment.

(3) Liquid Crystalline TPEE

This is a thermoplastic elastomer using rigid liquid crystal molecules as the hard segment and aliphatic polyester as the soft segment.

Examples of the polyester segment may include polyester segments containing a dicarboxylic acid component, including: aromatic dicarboxylic acid, such as terephthalic acid, isophthalic acid, and naphthalenedicarboxylic acid; alicyclic dicarboxylic acid, such as 1,4-cyclohexanedicarboxylic acid; and aliphatic dicarboxylic acid, such as succinic acid and adipic acid, and a diol component, including: aliphatic diol, such as ethylene glycol, 1,2-propylene glycol, and 1,4-butanediol; and alicyclic diol, such as cyclohexane-1,4-dimethanol. Examples of the polyether segment may include aliphatic polyether segments, such as polyethylene glycol, polypropylene glycol, and polybutylene glycol. The polyester-based thermoplastic elastomer is preferably a modified polyester-based thermoplastic elastomer and more preferably a maleic anhydride-modified polyester-based thermoplastic elastomer.

The polystyrene-based thermoplastic elastomer usually contains, but not particularly limited to, a styrene-monomer polymer block (Hb) as the hard segment and a conjugated diene-compound polymer block or a hydrogenated block thereof (Sb) as the soft segment. The styrene-based thermoplastic elastomer may have a structure of a diblock structure represented by Hb-Sb, a triblock structure represented by Hb-Sb-Hb or Sb-Hb-Sb, a tetrablock structure represented by Hb-Sb-Hb-Sb, or a polyblock structure in which totally 5 or more of Hb and Sb are linearly bonded.

The styrene-based monomer used for the styrene-monomer polymer block (Hb) is not particularly limited and examples of the monomer may include styrene, derivatives thereof, and the like. Specific examples may be vinyl group-containing aromatic compounds, including: styrenes, such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene, and t-butoxystyrene; vinylnaphthalenes, such as 1-vinylnaphthalene and 2-vinylnaphthalene; and the like, vinylene group-containing aromatic compounds, such as indene and acenaphthylene, and the like. Among all, styrene is preferred. Such a styrene-based monomer may be only one type or may be two or more types.

The conjugated diene compound used for the conjugated diene-compound polymer block or a hydrogenated block thereof (Sb) is also not particularly limited and examples of the compound may include butadiene, isoprene, 2,3-dimethylbutadiene, pentadiene, hexadiene, and the like. Among all, butadiene is preferred. Such a conjugated diene compound may be only one type or may be two or more types. Moreover, another comonomer, for example, ethylene, propylene, butylene, or styrene may be copolymerized. The conjugated diene-compound polymer block may be a hydrogenation product that is partially or completely hydrogenated.

Specific examples of the polystyrene-based thermoplastic elastomer may include styrene-isoprene diblock copolymers (SI), styrene-butadiene diblock copolymers (SB), styrene-isoprene-styrene triblock copolymers (SIS), styrene-butadiene/isoprene-styrene triblock copolymers (SB/IS), and styrene-butadiene-styrene triblock copolymers (SBS), and hydrogenation products thereof. Among all, preferred is at least one selected from the group consisting of hydrogenation product of styrene-isoprene diblock copolymers (SEP), hydrogenation product of styrene-butadiene diblock copolymers (SEB), hydrogenation product of styrene-isoprene-styrene triblock copolymers (SEPS), hydrogenation product of styrene-butadiene/isoprene-styrene triblock copolymers (SEEPS), and hydrogenation product of styrene-butadiene-styrene triblock copolymers (SEBS). The polystyrene-based thermoplastic elastomer is preferably a modified polystyrene-based thermoplastic elastomer and more preferably a maleic anhydride-modified polystyrene-based thermoplastic elastomer.

The polyurethane-based thermoplastic elastomer (TPU) is a linear multiblock copolymer containing: (1) polyurethane obtained by reaction of short chain glycol with isocyanate as the hard segment; and (2) polyurethane obtained by reaction of long chain glycol with isocyanate as the soft segment. The polyurethane in this context is a collective term for compounds having a urethane bond (—NHCOO—) obtained by polyaddition reaction (urethane formation reaction) of isocyanate (—NCO) with alcohol (—OH). The polyurethane-based thermoplastic elastomer is preferably a modified polyurethane-based thermoplastic elastomer and more preferably a maleic anhydride-modified polyurethane-based thermoplastic elastomer.

The polyolefin-based thermoplastic elastomer includes thermoplastic elastomers, for example, containing a polyolefin block, such as polypropylene and polyethylene, as the hard segment and a rubber block, such as an ethylene-propylene-diene copolymer, as the soft segment. Such thermoplastic elastomers include a blend type and an implant type. Modified polyolefin-based thermoplastic elastomers may include a maleic anhydride-modified ethylene-butene-1 copolymer, a maleic anhydride-modified ethylene-propylene copolymer, butyl halide-based rubber, modified polypropylene, and modified polyethylene. The polyolefin-based thermoplastic elastomer is preferably a modified polyolefin-based thermoplastic elastomer and more preferably a maleic anhydride-modified polyolefin-based thermoplastic elastomer.

The polyamide-based thermoplastic elastomer (TPA) is a multiblock copolymer using polyamide as the hard segment and polyether or polyester with low Tg as the soft segment. The polyamide component constituting the hard segment is selected from nylon 6, 66, 610, 11, 12, and the like, where nylon 6 and nylon 12 are predominant. As the constituent of the soft segment, long chain polyols, such as polyetherdiol and polyesterdiol, are used. Representative examples of such polyetherpolyol may include diol poly(oxytetramethylene) glycol (PTMG), poly(oxypropylene)glycol, and the like. Representative examples of such polyesterpolyol may include poly(ethylene adipate)glycol, poly(butylene-1,4-adipate)glycol, and the like. The polyamide-based thermoplastic elastomer is preferably an acid-modified polyamide-based thermoplastic elastomer and more preferably a maleic anhydride-modified polyamide-based thermoplastic elastomer.

(Phase Separation Structure)

In the present resin composition, particles of the thermoplastic elastomer (B) are preferably dispersed in a matrix of the EVOH (A). That is, the present resin composition preferably has a sea-island structure in which the sea phase contains the EVOH (A) and the island phase contains the particles of the thermoplastic elastomer (B). When the present resin composition has such a sea-island structure in which the sea phase contains the EVOH (A) and the island phase contains the particles of the thermoplastic elastomer (B), the EVOH (A) preferably accounts for 80 mass % or more of the sea phase, more preferably 90 mass % or more, and may account for 100 mass %. The particles of the thermoplastic elastomer (B) preferably accounts for 80 mass % or more of the island phase, more preferably 90 mass % or more, and may account for 100 mass %.

When the present resin composition has such a sea-island structure in which the sea phase contains the EVOH (A) and the island phase contains the particles of the thermoplastic elastomer (B), from the perspective of improvement in transparency, the thermoplastic elastomer (B) preferably has an average particle diameter of 4.5 μm or less, more preferably 3.5 μm or less, even more preferably 3.0 μm or less, particularly preferably 2.5 μm or less, and most preferably 2.0 μm or less. The thermoplastic elastomer (B) may have an average particle diameter of 0.1 μm or more. The thermoplastic elastomer (B) having an average particle diameter within the above range is preferred for improvement in flexibility, while maintaining gas barrier properties and transparency, and further improvement in delamination properties. In the present invention, the average particle diameter of the thermoplastic elastomer (B) can be controlled by kneading intensity control and the composition ratio of the EVOH (A) to the thermoplastic elastomer (B).

In the present invention, a refractive index difference between the EVOH (A) and the thermoplastic elastomer (B) is preferably 0.05 or less, more preferably 0.04 or less, and even more preferably 0.03 or less. The refractive index difference may be 0.005 or more. The refractive index difference within the above range is preferred for better transparency of the present resin composition.

(Other Components)

The present resin composition may contain compounds, such as various types of acid and metal salt, as long as not inhibiting the effects of the present invention. As such acid, carboxylic acids, phosphate compounds, boron compounds, and the like are used and specific examples may include the following.

Carboxylic acids: oxalic acid, succinic acid, benzoic acid, citric acid, acetic acid, lactic acid, etc.

Phosphate compounds: various acids, such as phosphoric acid and phosphorous acid, salts thereof, etc.

Boron compounds: boric acids, borate ester, borate, boron hydrides, etc.

Examples of acid constituting the metal salt may include carboxylic acid, phosphoric acid, and the like, where the carboxylic acid preferably has a carbon number from 1 to 30 and specific examples of such carboxylic acid may include acetic acid, propionic acid, stearic acid, lauric acid, montanic acid, behenic acid, octylic acid, sebacic acid, and the like. As metal constituting the metal salt, alkali metal and alkaline earth metal are preferably used. Specific examples of the metal salt may include sodium acetate, potassium acetate, sodium phosphate, lithium phosphate, sodium stearate, potassium stearate, magnesium acetate, calcium acetate, magnesium phosphate, calcium phosphate, magnesium stearate, calcium stearate, and the like. As the metal salt, metal salt of polycarboxylic acid, such as ethylenediaminetetraacetic acid, may be used.

To the resin composition, various additives other than above may be blended as needed. Examples of such additives may include antioxidants, plasticizers, ultraviolet absorbers, antistatic agents, lubricants, heat stabilizers, colorants, fillers, and other polymer compounds. They may be blended as long as not inhibiting the action and effects of the present invention. Specific examples of the additives may include the following.

Antioxidants: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), etc.

Plasticizers: diethyl phthalate, dibutyl phthalate, dioctyl phthalate, wax, liquid paraffin, phosphate, etc.

Ultraviolet absorbers: ethylene-2-cyano-3,3'-diphenylacrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, etc.

Antistatic agents: pentaerythritol monostearate, sorbitan monopalmitate, sulfated polyolefins, polyethylene oxide, etc.

Lubricants: ethylene bisstearoamide, butyl stearate, etc.

<Multilayer Structure>

In the multilayer structure of the present invention, the layer of the present resin composition has one surface directly adjacent to the layer of the polyolefin (C1) with no polar functional group. Such configuration allows good delamination properties between the layer of the present resin composition and the layer of the polyolefin (C1) with no polar functional group and preferred use as a delaminatable container.

(Polyolefin (C1) with No Polar Functional Group)

The polyolefin (C1) with no polar functional group is a homopolymer or a copolymer of olefin that has no polar functional group. Preferably used examples of such a homopolymer or a copolymer of olefin may include homopolymers or copolymers of olefins, such as linear low density polyethylene (LLDPE), low density polyethylene (LDPE), very low density polyethylene (VLDPE), medium density polyethylene (MDPE), high density polyethylene (HDPE), an ethylene-propylene (block or random) copolymer, polypropylene (PP), a copolymer of propylene and α-olefin having a carbon number from 4 to 20, polybutene, polypentene, and polymethylpentene. Among all, preferably used is at least one selected from the group consisting of low density polyethylene (LDPE), polypropylene (PP), high density polyethylene (HDPE), and an ethylene-propylene (block or random) copolymer.

(Polyolefin (C2) and Adhesive Resin (D))

In a preferred embodiment of the multilayer structure of the present invention, the other surface of the layer of the resin composition is adhered to a layer of polyolefin (C2) via a layer of an adhesive resin (D). Such configuration is preferred for higher flexibility and strength of the multilayer structure of the present invention. The polyolefin (C2) may be same as the polyolefin (C1) with no polar functional group or may be modified polyolefin with unsaturated carboxylic acid or a derivative thereof. Examples of such unsaturated carboxylic acid or a derivative thereof may include maleic acid, fumaric acid, itaconic acid, maleic anhydride, itaconic anhydride, monomethyl maleate, monoethyl maleate, diethyl maleate, and monomethyl fumarate. They may be used singly or in combination of two or more.

As the adhesive resin (D), modified polyolefin resins modified with unsaturated carboxylic acid or a derivative thereof and ethylene-vinyl acetate copolymers may be preferably used. As such unsaturated carboxylic acid or a derivative thereof, those listed for the polyolefin (C2) as examples may be preferably used. The ethylene-vinyl acetate copolymer may be, in addition to a random copolymer produced by polymerization of ethylene and vinyl acetate by a known method, a terpolymer produced by copolymerization with still another monomer or a modified ethylene-vinyl acetate copolymer modified by grafting and the like. They may be used singly or in combination of two or more.

(Layer Configuration)

Examples of layer configuration of the multilayer structure of the present invention may include the following. A denotes the layer of the present resin composition, C1 denotes the layer of the polyolefin (C1) with no polar functional group, AD denotes the layer of the adhesive resin (D), and C2 denotes the layer of the polyolefin (C2).

C1/A
C1/A/AD/C2
C1/A/AD/C2/AD/A
C1/A/AD/C2/AD/C2
C 1/A/AD/C2/AD/A/AD/C2
C1/A/AD/C2/AD/C2/AD/C2

A method of producing a laminate of the present invention may be exemplified by, but not particularly limited to, extrusion lamination, dry lamination, coinjection molding, coextrusion molding, and the like. Examples of the coextrusion molding may include coextrusion lamination, coextrusion sheet forming, coextrusion inflation molding, coextrusion blow molding, and the like.

A sheet, a film, a parison, or the like of a laminate thus obtained may be reheated and uniaxially or biaxially stretched by thermoformation, such as draw molding, roll stretching, pantograph stretching, inflation stretching, blow molding, and the like to obtain a stretched molded article.

The layer of the present resin composition preferably has a thickness of 0.5 μm or more, more preferably 1 μm or more, and even more preferably 5 μm or more. A layer of the present resin composition having a thickness of less than 0.5 μm is prone to cause insufficient gas barrier properties. The layer of the present resin composition preferably has a thickness of 1000 μm or less, more preferably 500 μm or less, and even more preferably 100 μm or less. A layer of the present resin composition having a thickness of more than 1000 μm is prone to have insufficient flexibility and reduced delamination properties.

In the multilayer structure of the present invention, the layer of the polyolefin (C1) preferably has a thickness of 25 μm or more, more preferably 30 μm or more, and even more preferably 50 μm or more. A layer of the polyolefin (C1) having a thickness of less than 25 μm is prone to lack strength. The layer of the polyolefin (C1) preferably has a thickness of 5000 μm or less, more preferably 2000 μm or less, and even more preferably 1000 μm or less. A layer of the polyolefin (C1) having a thickness of more than 5000 μm is prone to have insufficient flexibility and reduced delamination properties.

The multilayer structure of the present invention preferably has a total thickness of 150 μm or more and more preferably 200 μm or more. A multilayer structure having a total thickness of less than 150 μm is prone to be broken due to lack of strength. The multilayer structure preferably has a total thickness of 10000 μm or less, more preferably 8000 μm or less, and even more preferably 6000 μm or less. A multilayer structure having a total thickness of more than 10000 μm is prone to have reduced transparency and flexibility.

(Delamination Properties)

In the multilayer structure of the present invention, a delamination area between the layer of the present resin composition and the layer of the polyolefin (C1) is preferably 80 $cm^2$ or more, more preferably 150 $cm^2$ or more, even more preferably 200 $cm^2$ or more, and particularly preferably 220 $cm^2$ or more. A delamination area of less than 80 $cm^2$ is prone to cause insufficient delamination. The delamination area is preferably 300 $cm^2$ or less, more preferably 280 $cm^2$ or less, and even more preferably 260 $cm^2$ or less. A delamination area of more than 300 $cm^2$ causes too high delamination properties and leads to interlayer disorder during multilayer structure molding or delaminatable container molding, prone to reduce productivity. The delamination area in this context can be obtained by cutting the multilayer structure into 300 mm (width)×350 mm (length), producing a delamination port between the layer of the resin composition and the layer of the polyolefin (C1) at the center to blow air at a pressure of 0.2 MPa through a tube inserted from the delamination port by 50 mm long for delamination and convert the weight of the thus delaminated portion to an area.

The multilayer structure of the present invention preferably has standard peel strength between the layer of the resin composition and the layer of the polyolefin (C1) of 1 g/30 mm or more, more preferably 3 g/30 mm or more, and even more preferably 5 g/30 mm. Standard peel strength of less than 1 g/30 mm causes too high delamination properties and leads to interlayer disorder during multilayer structure molding or delaminatable container molding, prone to reduce productivity. The standard peel strength is preferably 12 g/30 mm or less, more preferably 11 g/30 mm or less, even more preferably 9.5 g/30 mm or less, and particularly preferably 9.0 g/30 mm or less. Standard peel strength of more than 12 g/30 mm is prone to cause insufficient delamination properties.

(Use)

A preferred embodiment of use of the multilayer structure of the present invention is, but not particularly limited to, a delaminatable container having the layer of the polyolefin (C1) as an outer layer. The multilayer structure of the present invention has, as described earlier, good delamination properties between the layer of the resin composition and the layer of the polyolefin (C1) and has good flexibility while maintaining excellent gas barrier properties and transparency. Accordingly, this multilayer structure is preferably used as a delaminatable container for foods capable of preventing degradation of aroma, color, and the like of the contents. When the multilayer structure of the present invention is used as a delaminatable container, a top mouth portion having a greater thickness compared with other portions is preferred from the perspective of inhibiting delamination in the top mouth portion.

EXAMPLES

The present invention is described below even more specifically with reference to Examples. In the present Examples, the following materials were used.
[EVOH (A)]
A-1: EVAL® L171B (produced by Kuraray Co. Ltd., degree of saponification of 99.9 mol % or more, ethylene unit content of 27 mol %)
A-2: EVAL® E171 B (produced by Kuraray Co. Ltd., degree of saponification of 99.9 mol % or more, ethylene unit content of 44 mol %)
[Thermoplastic Elastomer (B)]
B-1: PRIMALLOY® GQ131 (produced by Mitsubishi Chemical Corp., an unsaturated carboxylic acid-modified polyester-based elastomeric resin)
B-2: PRIMALLOY® GQ430 (produced by Mitsubishi Chemical Corp., an unsaturated carboxylic acid-modified polyester-based elastomeric resin)
B-3: Taftec® H1041 (produced by Asahi Kasei Corp., a styrene-based elastomeric resin)
B-4: Taftec® M1911 (produced by Asahi Kasei Corp., a carboxylic acid-containing styrene-based elastomeric resin)
B-5: ESTANE® 58300 (produced by Lubrizol Corp., a TPU resin)
[Added Resin in Comparative Example 3]
Novatec™ PP EA7AD (produced by Japan Polyethylene Corp., a PP resin)
(1) Preparation of Single Layer Film
Using resin composition pellets obtained in Examples and Comparative Examples and Novatec® LJ400 (produced by Japan Polyethylene Corp., low density polyethylene (LDPE)), respective 2-type 3-layer multilayer films (LDPE/Resin Composition/LDPE=thickness of 100 μm/30 μm/100 μm) were continuously produced by a multilayer film extruder in the methods and conditions below, followed by delamination of the LDPE layers as the outer layers to prepare a single layer film of the resin composition.
[Extruder]
For the Resin Composition: 20 mmφ extruder laboratory machine ME type
CO-EXT (manufactured by Toyo Seiki Seisaku-sho, Ltd.)
For LDPE: 32 mmφ extruder GT-32-A (manufactured by Research Laboratory of Plastics Technology Co., Ltd.)
[Extrusion Temperature of the Resin Composition]
Supply Area/Compression Area/Measurement Area/Die=170/210/220/220° C.
[Extrusion Temperature of LDPE]
Supply Area/Compression Area/Measurement Area/Die=170/210/220/220° C.
[Die]
300 mm width coat hanger die (manufactured by Research Laboratory of Plastics Technology Co., Ltd.)

(2) Preparation of Multilayer Film
Using resin composition pellets obtained in Examples and Comparative Examples, Novatec® LJ400 (produced by Japan Polyethylene Corp., low density polyethylene (LDPE)), and Modic® L553 (produced by Mitsubishi Chemical Corp., a polyolefin-based adhesive resin, hereinafter, may also be referred to as Ad), respective 3-type 4-layer multilayer films (LDPE/Resin Composition/Ad/LDPE=thickness of 110 μm/20 μm/10 μm/100 μm) were continuously produced by a multilayer film extruder in the methods and conditions below.
[Extruder]
For the Resin Composition: 20 mmφ extruder laboratory machine ME type CO-EXT (manufactured by Toyo Seiki Seisaku-sho, Ltd.)
For Ad: 20 mmφ extruder SZW20GT-20MG-STD (manufactured by Technovel Corp.)
For LDPE: 32 mmφ extruder GT-32-A (manufactured by Research Laboratory of Plastics Technology Co., Ltd.)
[Extrusion Temperature of the Resin Composition]
Supply Area/Compression Area/Measurement Area/Die=180/210/220/220° C.
[Extrusion Temperature of Ad]
Supply Area/Compression Area/Measurement Area/Die=170/210/220/220° C.
[Extrusion Temperature of LDPE]
Supply Area/Compression Area/Measurement Area/Die=170/210/220/220° C.
[Die]
300 mm width coat hanger die (manufactured by Research Laboratory of Plastics Technology Co., Ltd.)
(3) Delamination Area Measurement
Multilayer films obtained in Examples and Comparative Examples were cut into 300 mm (width)×350 mm (length) and a delamination port was produced for each between LDPE and the resin composition (LDPE//Resin Composition/Ad/LDPE; the "//" in this context means an area between the two layers) in the central area. An air blowing tube was inserted 50 mm into the delamination port to blow air at a pressure of 0.2 MPa for delamination. Only the delaminated surface was cut from the entire film for conversion to an area by the weight method to obtain a delamination area.
(4) Refractive Index Measurement
Each resin to be measured was subjected to film extrusion molding at an extrusion temperature of 210° C. to obtain an unstretched film having a thickness of 20 μm. The film thus obtained was subjected to refractive index measurement using an Abbe refractometer (Model 4T manufactured by Atago Co., Ltd., SL-Na-1 lamp manufactured by Toshiba Corp.).
(5) Young's modulus measurement
The single layer films obtained in Examples and Comparative Examples were cut into each strip of 15 mm (width)×50 mm (height) and subjected to Young's modulus measurement in the MD direction in a condition at a testing speed of 5 mm/min by an Autograph ("AGS-H" manufactured by Shimadzu Corp.) in accordance with ASTM D-638 as an index of flexibility. The measurement was performed on 5 samples for each and an average value for each was obtained. A lower Young's modulus indicates higher flexibility.
(6) Number of Pinholes After Flexion
The single layer films obtained in Examples and Comparative Examples were subjected to flexion repeated 100 times in an environment at 5° C. using "BE1006, Gelbo Flex Tester with a thermostatic chamber" manufactured by Tester Sangyo Co., Ltd. in accordance with ASTM F392-74. The number of pinholes after flexion was measured in the A4 size (210 mm×297 mm). The measurement was performed on 3 samples for each and an average value for each was obtained. Fewer pinholes after flexion indicate higher flexibility (flexion resistance).

(7) Measurement of Bending Modulus of Elasticity

Using resin compositions obtained in Examples and Comparative Examples, ISO standard test pieces were produced in the conditions at a cylinder temperature of 220° C. and a mold temperature of 50° C. by an 80-ton injection molding machine manufactured by Nissei Plastic Industrial Co., Ltd. The injection molded test pieces thus obtained were subjected to measurement in accordance with ISO 178.

(8) Peel Strength Measurement

Multilayer films obtained in Examples and Comparative Examples were subjected to T-peel strength measurement using an adhesion and peeling resistance tester (HEIDON Type 17 manufactured by Shinto Scientific Co., Ltd.).

Specifically, a strip of 30 mm (width)×150 mm (length) were cut from the central area of each prepared film. The outer layer and the inner layer in the stripe were delaminated from 40 to 50 mm at a testing speed of 200 mm/min so that the stripe was peeled in the T shape. Average strength ignoring initial rising strength was defined as "standard peel strength".

(9) Internal Haze

The single layer films thus obtained was subjected to internal haze measurement using a Poic integrating-sphere light transmittance/complete light reflectance meter (HR-100 Model manufactured by Murakami Color Technology Laboratories) in accordance with ASTM D1003-61.

(10) Average Particle Diameter

An average particle diameter of the thermoplastic elastomer (B) was obtained by taking a picture of particles on a TD surface of each single layer film with a transmission electron microscope (H-800NA manufactured by Hitachi, Ltd., etc.) and measuring particle diameters of the particles observed in a unit visual field in the picture using image analysis particle size distribution measuring software (Macview (Mountech Co., Ltd.)). At this time, each particle diameter was obtained as a circle-equivalent diameter, which is a diameter of a circle with an area identical to the particle, to calculate an average primary particle diameter from the number of particles and the particle diameters. In addition, a standard deviation (SD value) of the particle diameters was also obtained. A smaller SD value is preferred for less variation in the particle diameters.

(11) OTR (Oxygen Transmission Rate)

Single layer films with a thickness of 20 μm obtained in Examples and Comparative Examples were subjected to measurement in accordance with the method described in JIS K 7126 (equal pressure method) in the conditions at a temperature of 20° C. and a humidity of 65% RH using an oxygen transmission rate measuring device "OX-TRAN MODEL 2/20" (identification limit of 0.01 ml·20 μm/m$^2$·day·atm) manufactured by MOCON Inc.

Example 1

[Preparation of Resin Composition Pellets]

80 parts by weight of (A-1) as the EVOH (A) and 20 parts by weight of (B-1) as the thermoplastic elastomer (B) were dry blended and extruded into pellets, using a 30 mmφ twin-screw extruder (TEX-30SS-30CRW-2V manufactured by Japan Steel Works, Ltd.), in the conditions at 220° C., a screw rotation rate of 200 rpm, and an extruded resin amount of 25 kg/hour, followed by drying at 30° C. for 16 hours under a reduced pressure to obtain resin composition pellets.

[Preparation of Films]

Using the resin composition pellets thus obtained, a single layer film and a multilayer film were produced by the above methods and subjected to the respective property evaluations. The obtained results are collectively shown in Table 1.

Examples 2 to 9, Comparative Examples 1 to 3

In the method same as that in Example 1 except for changing the types, the blended amounts, and the screw rotation rates of the EVOH (A) and the thermoplastic elastomer (B) as shown in Table 1, resin composition pellets, single layer films, and multilayer films were produced and subjected to the respective property evaluations. The obtained results are collectively shown in Table 1. In Comparative Example 3, polyolefin, which is not a thermoplastic elastomer, was used instead of the thermoplastic elastomer (B).

TABLE 1

| | | Unit | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|---|
| Resin Composition | Ethylene-Vinyl Alcohol Copolymer (A) | — | EVOH (A-1) | EVOH (A-1) | EVOH (A-1) | EVOH (A-1) | EVOH (A-1) | EVOH (A-1) | EVOH (A-1) | EVOH (A-2) | EVOH (A-1) | EVOH (A-1) | EVOH (A-1) | EVOH (A-1) |
| | Ethylene Unit Content | mol % | 27 | 27 | 27 | 27 | 27 | 27 | 27 | 44 | 27 | 27 | 27 | 27 |
| | Blended Amount | mass % | 80 | 80 | 90 | 80 | 90 | 70 | 80 | 80 | 80 | 97 | 60 | 80 |
| | Thermoplastic Elastomer (B) | — | Primalloy GQ131 (B-1) | Primalloy GQ430 (B-2) | Primalloy GQ131 (B-1) | Primalloy GQ131 (B-1) | Primalloy GQ430 (B-2) | Primalloy GQ131 (B-1) | Taftec H1041 (B-3)/ Taftec M1911 (B-4) 10/10 | Primalloy GQ131 (B-1) | Estane 58300 (B-5) | Primalloy GQ131 (B-1) | Primalloy GQ131 (B-1) | PP EA7AD |
| | Blended Amount | mass % | 20 | 20 | 10 | 20 | 10 | 30 | 20 | 20 | 20 | 3 | 40 | 20 |
| | Rotation Rate | rpm | 200 | 200 | 200 | 100 | 200 | 200 | 200 | 200 | 200 | 200 | 200 | 200 |
| Property Evaluation | OTR | cc · 20 μm/ (m² · day · atm) | 0.2 | 0.2 | 0.2 | 0.2 | 0.1 | 0.2 | 0.2 | 0.4 | 0.2 | 0.2 | 0.7 | 0.5 |
| | Delamination Area | cm² | 228 | 231 | 244 | 207 | 237 | 215 | 213 | 223 | 172 | 245 | 58 | 4 |
| | Refractive Index Difference | | 0.03692 | 0.01947 | 0.03692 | 0.03692 | 0.01947 | 0.03692 | 0.0245 | 0.03192 | 0.0091 | 0.03692 | 0.01947 | 0.0523 |
| | Young's Modulus | MPa | 2135 | 2242 | 2327 | 2091 | 2495 | 1987 | 2027 | 1940 | 1891 | 2601 | 1772 | 2428 |
| | Number of Pinholes after Flexion | number | 4 | 7 | 26 | 5 | 32 | 1 | 9 | 1 | 7 | 51 | 0 | 48 |
| | Bending Modulus of Elasticity | MPa | 3221 | 3291 | 3728 | 3193 | 3822 | 2951 | 3070 | 2676 | 3010 | 4092 | 2631 | 3720 |
| | Standard Peel Strength | g/30 mm | 8.4 | 8.4 | 7.2 | 10.1 | 7.6 | 9.4 | 9.6 | 8.8 | 11.4 | 7 | 18.6 | 66 |
| | Internal Haze | % | 3.9 | 2.6 | 2.0 | 4.2 | 1.0 | 6.7 | 8.2 | 3.3 | 4.5 | 0.6 | 15.3 | 21.5 |
| | Average Particle Diameter (SD Value) | μm | 1.26 (1.01) | 1.77 (1.57) | 1.06 (0.97) | 1.45 (1.47) | 1.51 (1.23) | 1.34 (1.43) | 3.9 (4.6) | 1.43 (1.51) | 3.14 (4.23) | 0.88 (0.95) | 7.49 (6.51) | 9.45 (11.6) |

As shown in Table 1, any of Examples 1 to 9 had good transparency (low haze), flexibility (fewer pinholes (high flexion resistance), a low Young's modulus, and a low bending modulus of elasticity), and delamination properties (low standard peel strength and a high delamination area). Comparative Example 1 with a less content of the thermoplastic elastomer (B) was poor in flexibility and developed more pinholes after flexion. Comparative Example 2 with a more content of the thermoplastic elastomer (B) turned out to have severely reduced delamination properties and transparency. Comparative Example 3 using a resin composition containing polyolefin instead of the thermoplastic elastomer (B) had severely reduced delamination properties and transparency and also had reduced flexibility.

Reference Example 1

[Preparation of Delaminatable Container]

A delaminatable container with a body and a top mouth portion was produced by blow molding in the following conditions.
(Shape of Container)
Body: φ47 mm, height 110 mm
Top Mouth Portion: φ30 mm, height 16 mm
(Layer Configuration)
Outer Layer: unmodified polypropylene (NOBLEN® FSX16E9 produced by Sumitomo Chemical Co., Ltd.)
Inner Layer: 3-layer configuration of outermost layer/adhesive layer/inner surface layer in order from the outer layer
Outermost Layer: the resin composition used in Example 1
Adhesive Layer: 1:1 blend of modified polyolefin (Modic® L522 produced by
Mitsubishi Chemical Corp.) and LLDPE (HARMOREX® F325N produced by Japan Polyethylene Corp.)
Inner Surface Layer: LLDPE (HARMOREX® F325N produced by Japan Polyethylene Corp.)
(Blow Molding Conditions)

The resins respectively molten to form the above layer configuration were coextruded to produce a laminated parison in a molten state. During production of the laminated parison, a lip width was controlled to have a greater thickness of the top mouth portion. Such a laminated parison was set in a blow molding mold and molded into a desired shape of container by blow molding. During blow molding, the top mouth portion was controlled to have a thickness sufficiently greater than the thickness of the body. The coextrusion conditions were adjusted to have thicknesses of both the outer layer and the inner layer other than the top mouth portion ranging from 70 to 130 μm and a thickness ratio of outer layer/inner layer ranging from 0.8 to 1.3. The blow molding conditions were: a blowing pressure of 0.4 MPa; a mold temperature of 25° C.; and blowing time of 15 seconds.
[Measurement of Thickness of Top Mouth Portion]

The top mouth portion of the delaminatable container thus obtained was cut with a microtome to prepare a section. Such a section was placed on a slide glass to measure a thickness of the top mouth portion with an optical microscope. The top mouth portion had a thickness of 0.5 mm.
[Delamination Properties of Top Mouth Portion]

An air inlet was formed in an outer layer of the body of the delaminatable container prepared in the above conditions and air was injected between the outer layer and the inner layer for preliminary delamination. The air was injected at a pressure of 0.3 MPa for 1.0 seconds. After the preliminary delamination, while the air inlet was closed, the container was squeezed with a force of approximately 30 kg to apply a pressure to the air between the outer layer and the inner layer. In this situation, whether or not the air leaked from an interface between the outer layer and the inner layer in the top mouth portion was checked. Evaluation results are shown in Table 2.
A: no air leakage observed from the interface in the top mouth portion
B: air leakage observed from the interface in the top mouth portion Reference Example 2

In the method same as that in Reference Example 1 except for producing a laminated parison without controlling the lip width and molding without controlling the thicknesses of the top mouth portion and the body during blow molding, a delaminatable container was produced for evaluation. Evaluation results are shown in Table 2.

TABLE 2

|  | unit | Reference Example 1 | Reference Example 2 |
|---|---|---|---|
| Resin composition | — | Example 1 | Example 1 |
| Thickness of top mouth portion | mm | 0.5 | 0.3 |
| Delamination properties of top mouth portion | — | A | B |

As in Reference Example 1, the container with some thickness in the top mouth portion was capable of readily inhibiting delamination of the top mouth portion. In contrast, as in Reference Example 2, the container with an insufficient thickness in the top mouth portion was difficult to inhibit delamination in the top mouth portion.

The invention claimed is:

1. A multilayer structure comprising:
a layer of a resin composition comprising an ethylene-vinyl alcohol copolymer and a thermoplastic elastomer;
a layer of a first polyolefin with no polar functional group;
a layer of a second polyolefin; and
a layer of an adhesive resin,
wherein
a mass ratio of the ethylene-vinyl alcohol copolymer to the thermoplastic elastomer is from 70/30 to 90/10,
the layer of the resin composition has one surface directly adjacent to the layer of the first polyolefin with no polar functional group,
the only resins in the resin composition are the ethylene-vinyl alcohol copolymer and the thermoplastic elastomer,
the thermoplastic elastomer comprises at least one selected from the group consisting of an unsaturated carboxylic acid-modified polyester-based thermoplastic elastomer, a styrene-based thermoplastic elastomer, and a polyurethane-based thermoplastic elastomer,
another surface, not directly adjacent to the layer of the first polyolefin with no polar functional group, of the layer of the resin composition is adhered to the second polyolefin via the layer of the adhesive resin, and
wherein standard peel strength between the layer of the resin composition and the layer of the first polyolefin is from 1 to 12 g/30 mm.

2. The multilayer structure according to claim 1, wherein, in the resin composition, particles of the thermoplastic elastomer are dispersed in a matrix of the ethylene-vinyl alcohol copolymer.

3. The multilayer structure according to claim 2, wherein the thermoplastic elastomer has an average particle diameter of 4.5 μm or less.

4. The multilayer structure according to claim 1, wherein a refractive index difference between the ethylene-vinyl alcohol copolymer and the thermoplastic elastomer is 0.05 or less.

5. The multilayer structure according to claim 1, wherein a delamination area between the layer of the resin composition and the layer of the first polyolefin is from 80 to 300 cm$^2$.

6. The multilayer structure according to claim 1, wherein the resin composition consists of the ethylene-vinyl alcohol copolymer and the thermoplastic elastomer.

7. The multilayer structure according to claim 1, wherein the thermoplastic elastomer comprises an unsaturated carboxylic acid-modified polyester-based thermoplastic elastomer.

8. The multilayer structure according to claim 1, wherein the thermoplastic elastomer comprises a polyurethane-based thermoplastic elastomer.

9. The multilayer structure according to claim 1, wherein the thermoplastic elastomer comprises a polystyrene-based thermoplastic elastomer.

10. The multilayer structure according to claim 1, wherein the thermoplastic elastomer comprises a carboxylic acid-containing styrene-based elastomeric resin.

11. The multilayer structure according to claim 1, consisting of:
    the layer of the resin composition;
    the layer of the first polyolefin with no polar functional group;
    the layer of the second polyolefin; and
    the layer of the adhesive resin.

12. A delaminatable container, comprising the multilayer structure according to claim 1.

13. The delaminatable container according to claim 12 having a top mouth portion that has a greater thickness compared with other portions of the container.

14. A multilayer structure comprising:
    a layer of a resin composition comprising an ethylene-vinyl alcohol copolymer and a thermoplastic elastomer containing a polyester-based thermoplastic elastomer;
    a layer of a first polyolefin with no polar functional group;
    a layer of a second polyolefin; and
    a layer of an adhesive resin,
    wherein
    a mass ratio of the ethylene-vinyl alcohol copolymer to the thermoplastic elastomer is from 70/30-90/10,
    the layer of the resin composition has one surface directly adjacent to the layer of a first polyolefin with no polar functional group, and
    another surface, not directly adjacent to the layer of the first polyolefin with no polar functional group, of the layer of the resin composition is adhered to the layer of the second polyolefin via the layer of the adhesive resin.

15. The multilayer structure according to claim 14, wherein, in the resin composition, particles of the thermoplastic elastomer are dispersed in a matrix of the ethylene-vinyl alcohol copolymer.

16. The multilayer structure according to claim 14, wherein the thermoplastic elastomer has an average particle diameter of 4.5 μm or less.

17. The multilayer structure according to claim 14, wherein a refractive index difference between the ethylene-vinyl alcohol copolymer and the thermoplastic elastomer is 0.05 or less.

18. The multilayer structure according to claim 14, wherein a delamination area between the layer of the resin composition and the layer of the first polyolefin is from 80 to 300 cm$^2$.

19. The multilayer structure according to claim 14, wherein standard peel strength between the layer of the resin composition and the layer of the first polyolefin is from 1 to 12 g/30 mm.

20. The multilayer structure of claim 14, consisting of:
    the layer of the resin composition;
    the layer of a first polyolefin with no polar functional group;
    the layer of the second polyolefin; and
    the layer of the adhesive resin.

* * * * *